Sept. 7, 1926.
H. M. SWOPE
1,599,068
LOCALIZED COUPLING
Filed Jan. 16, 1923
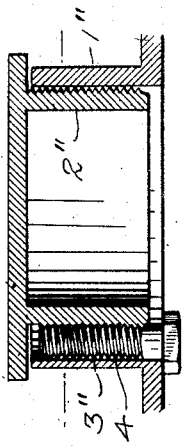
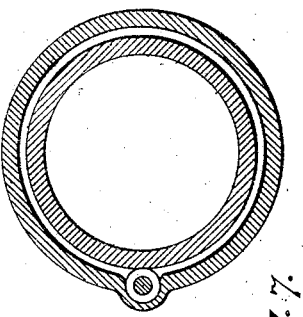
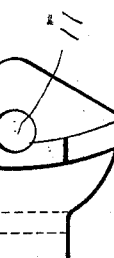
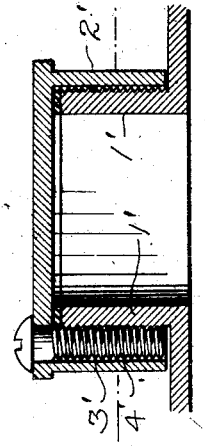
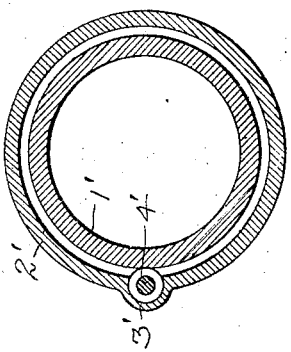
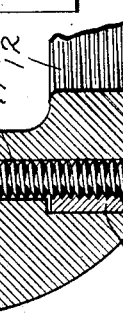
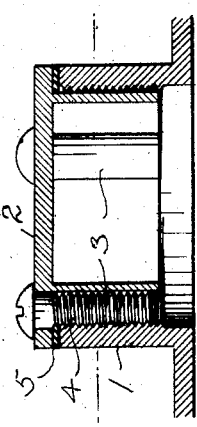
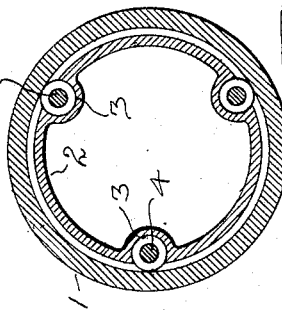
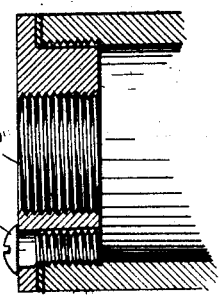
Inventor
Howard M. Swope
By F. L. Walker
Attorney Patented Sept. 7, 1926.

1,599,068

UNITED STATES PATENT OFFICE.

HOWARD M. SWOPE, OF DAYTON, OHIO.

LOCALIZED COUPLING.

Application filed January 16, 1923. Serial No. 613,070.

My invention relates to couplings, cap fasteners and the like and more particularly to means for fixedly interconnecting two relatively rotatable members, in any selected positions of revoluble adjustment.

The invention is particularly applicable to attachments of caps, plugs, bushings or other analogous bodies, wherein either the attached or the supporting member is screw threaded.

The invention involves the use of a screw stud mounted eccentrically in relation with a second screw threaded member, with the threads of which the screw stud tangentially engages on one side only, while the stud is guided and supported by an unthreaded abutment upon the side opposite such tangential threaded engagement. In practice, one of the members is provided with one or more longitudinally disposed grooves in its proximate face, to receive threaded screws or studs which project peripherally beyond such grooves and beyond the proximate face of the member into tangential threaded engagement with the second member.

The object of the invention is to simplify the structure as well as the means and mode of operation of detachable caps, plugs, bushings and the like, whereby they will not only be cheapened in construction, but will be more efficient in operation, capable of being easily and quickly adjusted and firmly secured in any selected position of revoluble adjustment, and unlikely to get out of repair.

A further object of the invention is to minimize the cost of manufacture, by eliminating the necessity for the second threaded member, and enable the use of a simple and cheap form of threaded screw in lieu of cutting threads of large diameter.

A further object of the invention is to provide such cheap and economical means, which will enable the attached member whether a cap, a plug, a reducer or bushing of other character to be firmly and securely held in any predetermined position of revoluble adjustment.

With the above primary and other incidental objects in view as will more fully appear in the specification, the invention consists of the features of construction, the parts and combinations thereof, and the mode of operation or their equivalents as hereinafter described and set forth in the claims.

In the accompanying drawings, there are shown several of the preferred embodiments of the invention, which, however, is capable of a wide variety of adaptations.

In the drawings, Fig. 1 is a sectional view, showing an unthreaded cap secured to an internally threaded attachment flange or boss. Fig. 2 is a transverse sectional view on line 2—2 of Fig. 1. Fig. 3 is a view similar to Fig. 1, but showing the unthreaded cap engaged with an exteriorly threaded flange collar. Fig. 4 is a transverse sectional view on line 4—4 of Fig. 3. Fig. 5 is a sectional view showing a threaded plug or bushing employed as a reducer in the end of a pipe or the like and secured in the manner hereinafter described. Fig. 6 is a detail sectional view of a hinge lug secured to a collar or interiorly threaded flange by the mode of attachment forming the subject matter hereof. Fig. 7 is a bottom plan view of the hinge lug shown in Fig. 6. Fig. 8 illustrates a further modification wherein a threaded bushing or plug is secured in an unthreaded collar. Fig. 9 is a transverse sectional view on line 9—9 of Fig. 8.

Like parts are indicated by similar characters of reference throughout the several views.

The present invention possesses a wide range of usefulness as a substitute for screw threaded engagement members of relatively large diameters, the expense of which is materially reduced by eliminating entirely the cost of threading one of the members, and it is particularly desirable for locating such relatively rotatable members in a selected position. This is particularly important for such purposes as attaching automobile radiator caps of the ornamental variety, wherein it is desired to place the ornament in a certain direction, for attaching motor meters to the radiator filler spout in order that the motor meter may face directly forward, for mounting gasolene gauges in fuel tanks by engaging them in the filler openings, in such relation that the gauge mechanism will occupy predetermined position within the tank. The invention is also applicable to mounting bushings or reducers in crank heads or for attaching plumbing fittings, especially in those instances wherein the fittings must occupy a certain predetermined position. It may also be applied for attaching small bodies or lugs and the like to one side of a threaded flange or similar mounting.

Referring to the drawing, 1 is an internally screw threaded flange collar which may be the flanged orifice of a fuel tank, the filler spout of a radiator, a plumbing fitting such as a wall or floor flange, or other analogous design. Ordinarily such internally threaded flange would receive an exteriorly threaded male member. In this instance, however, the male member 2, for illustrative purposes, has been shown as a peripherally flanged cap or plug, is entirely devoid of screw threads. Its diameter is such as to afford a sliding fit within the screw threaded interior of the flange 1. The periphery of such closure member 2 is indented at 3 to afford a grooved or semicircular recess in which is located an attachment screw 4 having threads, the pitch of which is equivalent to that of the screw threads upon the interior of the flanged collar 1. The periphery of such screw threaded stud 4 projects beyond the peripheral face of the closure member, and possesses screw threaded tangential engagement with the interior thread of the flange 1. Thus there are two screw threaded members, to wit: the flange 1 and screw threaded stud 4, which are of different diameter and eccentrically positioned for tangential engagement one with the other. This screw threaded engagement of the stud 4 with the collar 1, occurs upon one side only, while the opposite side of the screw thread bears against the inner face of the unthreaded groove or recess 3, which thereby forms a guide and abutment for holding the screw stud in its operative engagement with the collar. By tightening the screw stud 4, the peripheral flange of the closure 2 is drawn tightly upon the flange collar 1. However, a sealing gasket 5 is preferably interposed. For ordinary conditions of use a single screw stud is sufficient. However, if desired a plurality of the peripheral recesses 3 and screw studs 4 may be provided as shown in the sectional plan view Fig. 2. It is obvious that the closure 2 may be located in any selected position of revoluble adjustment in relation with the flange collar 1, and then fixedly secured in such position by tightening the screw stud 4.

The construction shown in Figs. 3 and 4 is merely the reversal of that shown in Figs. 1 and 2. In Fig. 3 the flanged collar 1' has been shown exteriorly threaded to receive a correspondingly interiorly threaded female cap or closure. However, in lieu of threading such female cap or closure, the closure 2' is devoid of screw threads, but is provided with a recess or groove 3' in its inner or proximate face, for engagement of the screw stud 4' which tangentially engages with the external threads of the collar 1'. The stud 4' is of much smaller diameter than the threaded collar and is eccentrically positioned outside said collar, but in tangential relation therewith. The threads of the screw and collar are held in their tangential interengagement by the backing or abutment afforded by the interior face of the unthreaded recess or groove 3' formed in the interior or proximate face of the closure.

Fig. 5 illustrates the invention as applied to a reducer or bushing. The construction is quite similar to that shown in Fig. 1 with the exception that the closure member or insert is provided with a central screw threaded opening 6, and such closure or bushing is devoid of external threads, but is secured in the threaded mouth of a pipe 7 by a stud 4.

In some instances, it is desirable to substitute for a screw threaded closure cap or plug upon a radiator filler spout or the filler opening of the fuel tank, a hinged lid or closure. In Fig. 6 the present invention has been illustrated as applied to the attachment of a hinge lug to such screw threaded flange opening. In this instance, the hinge lug 8 is provided with an arcuate slot 9 agreeing with and fitting over the side of the threaded flange 10. The hinge lug is also provided with a hole 11, which intersects the slot 9, particularly as shown in the bottom plan view Fig. 7. This hole 11, receives the screw stud 4, the periphery of which projects slightly beyond the recess or hole 11, and into the slot 9, where it has tangential engagement with the thread 12 upon the collar 10. By this means the hinge lug 8 may be secured in any selected radial position upon the collar 9, by the mere tightening of the screw 4.

In Figs. 8 and 9 there is shown a further modification or reversal of the construction wherein an exteriorly threaded closure plug or male member is engaged in a plane or unthreaded collar or female member. In this case the unthreaded flanged collar 1' is provided with an interior recess or groove 3'' to receive the stud 4, which projects beyond such groove or recess into tangential engagement with the closure member 2'', which is exteriorly threaded but slidingly insertable within the unthreaded collar.

It is to be understood that the invention is not limited to the attachment of automobile accessories, and indeed not limited to flanged collar connections or pipe connections, but may be employed in various mechanical constructions for attachment of machine elements and the like.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In a detachable connection, a threaded member having the conventional standard screw threads and an unthreaded member, and a screw threaded stud likewise having conventional standard screw threads lineally spaced in accordance with those of the first mentioned member engaged with the unthreaded member and eccentrically positioned in relation with the screw threads of the threaded member with the threads of which the threads of the stud tangentially engage.

2. In a connection of the character described, two screw threaded members each having conventional standard screw threads of like pitch of different diameters eccentrically positioned and tangentially engaged one with the other in any predetermined point about their circumferences substantially as and for the purpose specified.

3. Means for detachably connecting two members in predetermined radial relation, including a series of conventional standard screw threads upon one of the members, a revoluble screw threaded stud having conventional standard screw threads of like pitch carried by the other member in eccentric relation with said series of screw threads with which the threaded stud is tangentially engageable and an unthreaded guide abutment for the stud on the side opposite its tangential engagement with the series of threads by which the stud is held in engaged relation.

4. In a connection of the character described, two screw threaded members of different diameters eccentrically positioned and tangentially engaged one with the other, and an unthreaded guide for one of the members by which it is held in tangential threaded engagement with the other member.

5. In a connection of the character described, a screw threaded member, a second member engageable therewith having an axial groove therein, and a screw threaded stud revolubly located in said groove and extending therebeyond into tangential engagement with the threads of the said screw threaded member the members being engageable with each other at different tangential points to permit adjustment relative to each other.

6. In a connection of the character described, a male and a female member, detachably engageable one with the other, one of said members being screw threaded, the other member being devoid of threads and having a longitudinally disposed unthreaded groove in its proximate face, and a revoluble screw threaded stud located in said groove and extending therebeyond into tangential engagement with the threads of the threaded member.

7. In a connection of the character described, a screw threaded collar adapted to receive a closure cap provided with standard screw threads engageable with those of the collar, a substitute closure cap devoid of screw threads, and a screw threaded stud carried by the unthreaded closure cap and eccentrically positioned in relation with the screw threaded collar, the threads of which are lineally spaced in accordance with those of the collar with which they tangentially interlock to secure the substitute closure cap in place.

8. In a detachable connection, two members to be interconnected one of which is provided with a succession of standard screw threads, a screw threaded stud carried by the other member, the lineal spacing of the threads of said stud agreeing with those of the threaded member, said stud being eccentrically positioned in relation with the threaded member whereby the screw threads of the threaded member and stud tangentially interlock with each other the interlock being effected at any point on the threaded member, to enable desired relative adjustment of the first mentioned members one to another.

9. Means for connecting a fitting in any desired position of revoluble adjustment with a conventional screw threaded collar or the like, comprising a standard screw threaded stud of materially less diameter than the screw threaded collar eccentrically engaged therewith, with the screw threads of the stud and collar tangentially interlocked with each other in any desired position of revoluble adjustment of the collar.

In testimony whereof, I have hereunto set my hand this 8th day of January A. D. 1923.

HOWARD M. SWOPE.